(No Model.)

F. A. GRELLET.
VEGETABLE CUTTER.

No. 470,671. Patented Mar. 15, 1892.

WITNESSES:
Linus Barnes
Mary E. Barnes

INVENTOR
Frank A. Grellet
BY
George L. Barnes
ATTORNEY.

UNITED STATES PATENT OFFICE.

FRANK A. GRELLET, OF NEW HAVEN, CONNECTICUT, ASSIGNOR TO BENJAMIN HEMMING AND OTTO HEMMING, OF SAME PLACE.

VEGETABLE-CUTTER.

SPECIFICATION forming part of Letters Patent No. 470,671, dated March 15, 1892.

Application filed October 10, 1891. Serial No. 408,349. (No model.)

*To all whom it may concern:*

Be it known that I, FRANK A. GRELLET, a citizen of the United States, residing at New Haven, in the county of New Haven and State of Connecticut, have invented certain new and useful Improvements in Vegetable-Cutters, of which the following is a specification.

My invention relates to a machine for cutting cabbage or similar vegetable products, the object being to provide suitable apparatus for automatically conveying the vegetables against acting cutters or slicing-knives adapted to continuously slice the material and deposit it in the holding-receptacle in suitable condition for use.

The invention consists in the novel arrangement of a rotary cutter-head and cutters and combination therewith of the receiving-table and hopper and the endless conveyer, all as hereinafter more fully described and claimed.

Figure 1:
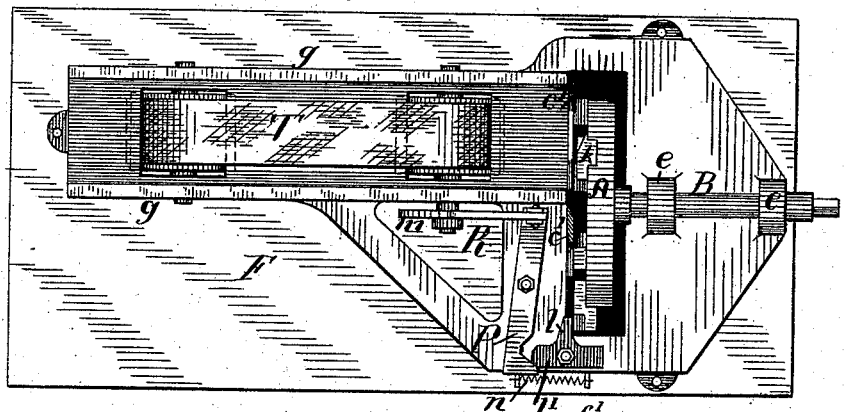
Figure 2:
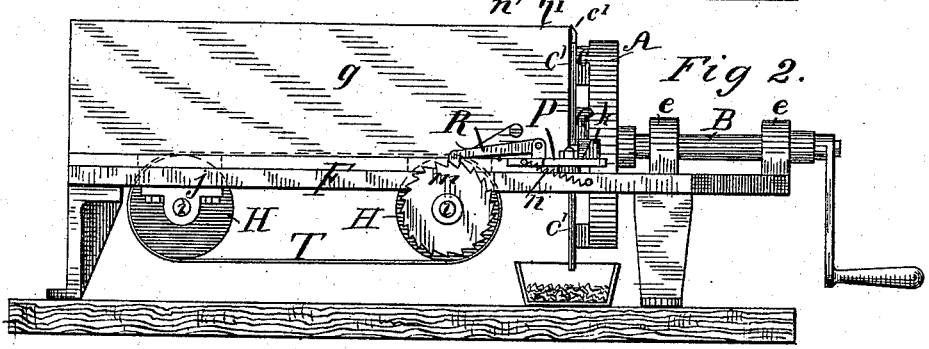
Figure 4:
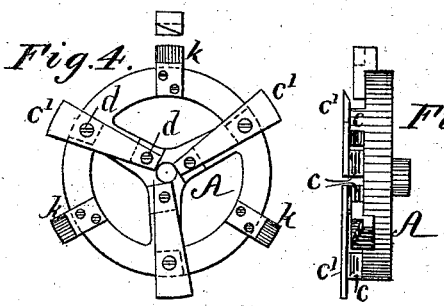
Figure 5:
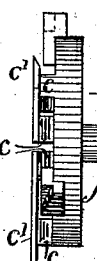
Figure 3:
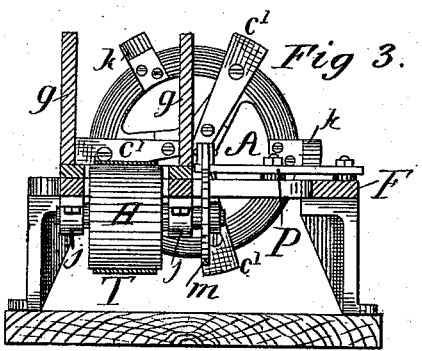

In the accompanying drawings, forming a part of this specification, Figure 1 is a plan view of my vegetable-cutting machine, and Fig. 2 is a side elevation of the same. Fig. 3 is an end sectional view represented as being viewed from the end opposite the cutter-head. Figs. 4 and 5 are front and side views of the cutter-head.

Referring to the drawings, A designates a rotary cutter-head, which is suitably secured on a crank-shaft B, adapted to be driven by hand or by mechanical power, as required. The said head is provided with a series of radial cutters $c'$, here three in number, secured to the head parallel therewith and raised therefrom by suitable lugs $c$, into which the holding-screws $d$ are screwed. The bearings $e$ of the crank-shaft are mounted upon a table F, through which the cutter-head projects in a vertical plane, as shown. Two vertical parallel sides $g$ are mounted on the table lengthwise therewith and adjacent to the cutters at that end, the space between the said sides being set wholly to one side of the axis of the head, forming a hopper or trough for the reception of the vegetables. Suitable drums H, having their journals $i$ in bearings $j$ on the lower side of the table, are arranged with their upper surfaces slightly above the table, and a canvas apron or belt T is passed around the drums to form a conveyer to feed the cabbage or other vegetables against the cutters. The conveyer derives movement from the motion of the cutter-head by means of a series of cams $k$, corresponding to the cutters, arranged on the cutter-head and adapted to engage and swing one arm $l$ of a bell-crank lever pivoted on the table, the other arm $l'$ engaging one end of a horizontal lever P, which carries a hooked pawl R at the opposite end, adapted at each vibration to engage a tooth of the ratchet $m$, which is secured on one of the drums of the conveyer. The lever is retracted by a spring $n$, and by this method the conveyer is fed forward a certain distance each time a cutter passes the bed of the table, and in operation when several cabbages or similar vegetables are placed in the hopper the cabbages which rest upon the table adjacent to the cutter-head will be pushed forward by those upon the conveyer and will be uniformly sliced by the rotating cutters and automatically fed. The sliced material will drop through the table, where it may be deposited in a suitable tray placed underneath the machine.

This machine is adapted to cut cabbage very rapidly and perfectly for the purposes for which this vegetable is required—as, for instance, the manufacture of sauer-kraut, which when made by hand chopping-knives is expensive and inferior to that produced by my improved means.

I claim—

In a vegetable-cutter, the combination of a table, a cutter-head and shaft mounted thereon and projecting beneath the bed of the table, a series of cutters or knives secured on said head, the side boards forming a hopper or receptacle on one side of the cutting-axis, the drums beneath said hopper, an apron rotating on said drums forming a conveyer within the hopper, a driving ratchet or toothed wheel for rotating the said conveyer, a series of cams on the cutter-head, levers or actuating mechanism adapted to be engaged by said cams in rotation, a pawl operated by said levers to actuate the said ratchet, and the retracting-spring, all arranged substantially in the manner and for the purpose specified.

FRANK A. GRELLET.

Witnesses:
PHILIP POND,
OTTO HEMMING.